United States Patent

Imaizumi et al.

[11] Patent Number: 5,902,042
[45] Date of Patent: May 11, 1999

[54] CONTINUOUS MIXER FOR LIQUIDS WITH ROTOR AND CASING GAP ADJUSTMENT

[75] Inventors: Toru Imaizumi; Koichi Ishida; Tsugio Nozoe, all of Chiba Prefecture, Japan

[73] Assignee: Dow Corning Toray Silicone Co., Ltd., Tokyo, Japan

[21] Appl. No.: 08/892,001

[22] Filed: Jul. 14, 1997

[30] Foreign Application Priority Data

Jul. 15, 1996 [JP] Japan .................................. 8-184345

[51] Int. Cl.$^6$ ........................................................ B01F 5/06
[52] U.S. Cl. ........................ 366/176.2; 366/286; 366/305
[58] Field of Search .................... 366/64, 96–99, 366/102, 131, 132, 134, 138, 176.1, 176.2, 194, 195, 279, 285, 286, 289, 305, 314, 332, 333, 342, 343; 422/133, 135

[56] References Cited

U.S. PATENT DOCUMENTS

| | | | |
|---|---|---|---|
| 1,237,222 | 8/1917 | Schroder | 366/286 |
| 1,987,944 | 1/1935 | Rafton | 366/176.2 X |
| 1,997,032 | 4/1935 | Alstad et al. | 366/305 X |
| 2,159,670 | 5/1939 | Neitzke | 366/286 X |
| 2,313,760 | 3/1943 | McLean | 366/286 |
| 2,591,966 | 4/1952 | Rider | 366/286 |
| 2,817,500 | 12/1957 | Robinson | 366/176.2 X |
| 2,995,346 | 8/1961 | Samples | 422/135 X |
| 3,514,079 | 5/1970 | Little, Jr. | 366/305 |
| 3,658,266 | 4/1972 | O'Keefe et al. | 366/305 X |
| 3,902,850 | 9/1975 | Lehnert | 422/135 X |
| 4,314,963 | 2/1982 | Boden et al. | 422/135 X |
| 4,834,545 | 5/1989 | Inoue et al. | 366/305 X |
| 5,088,831 | 2/1992 | Reinhall | 366/286 X |
| 5,366,288 | 11/1994 | Dahllof et al. | 366/176.2 |

FOREIGN PATENT DOCUMENTS 1604446  11/1990  U.S.S.R. .................. 366/305

*Primary Examiner*—Charles E. Cooley
*Attorney, Agent, or Firm*—William F. Boley

[57] ABSTRACT

A continuous mixer for liquids comprises a casing having a conical interior surface and a discharge outlet at the apex of the cone formed by the conical interior surface, a rotor that rotates at its center on the axis of the cone and has a conical exterior surface whose vertical angle is approximately equal to the vertical angle of the conical interior surface, a pressure-transport device that has one or more feed lines which communicate with a gap between the interior surface of the casing and the exterior surface of the rotor a position removed from the discharge outlet and that delivers one or more liquid inputs under pressure through the feed lines, and a gap-adjustment device capable of axially adjusting the rotor within the casing to adjust the gap. The internal pressure and temperature or the mixer can be controlled or adjusted while the rotor is rotating by changing the gap width along the axial direction.

2 Claims, 2 Drawing Sheets

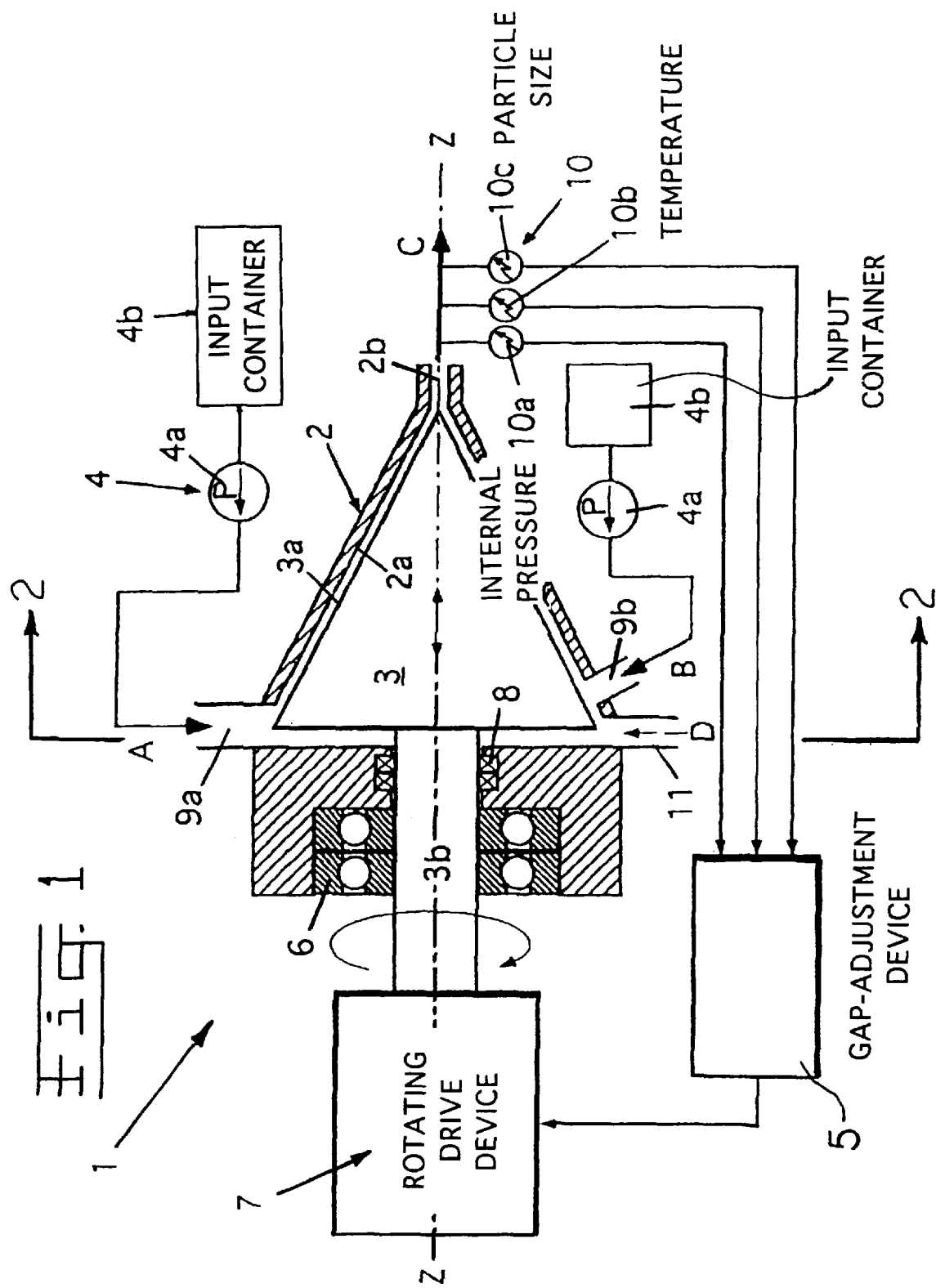

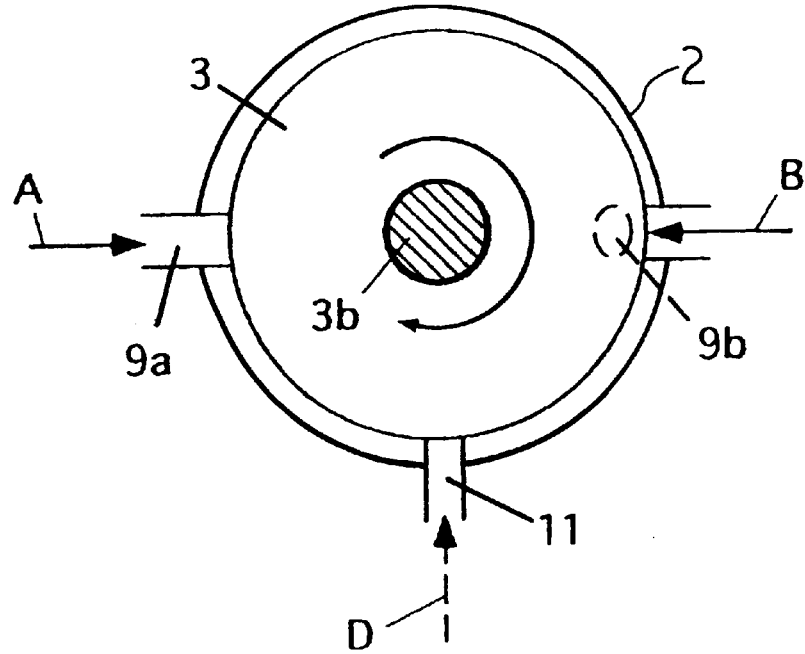
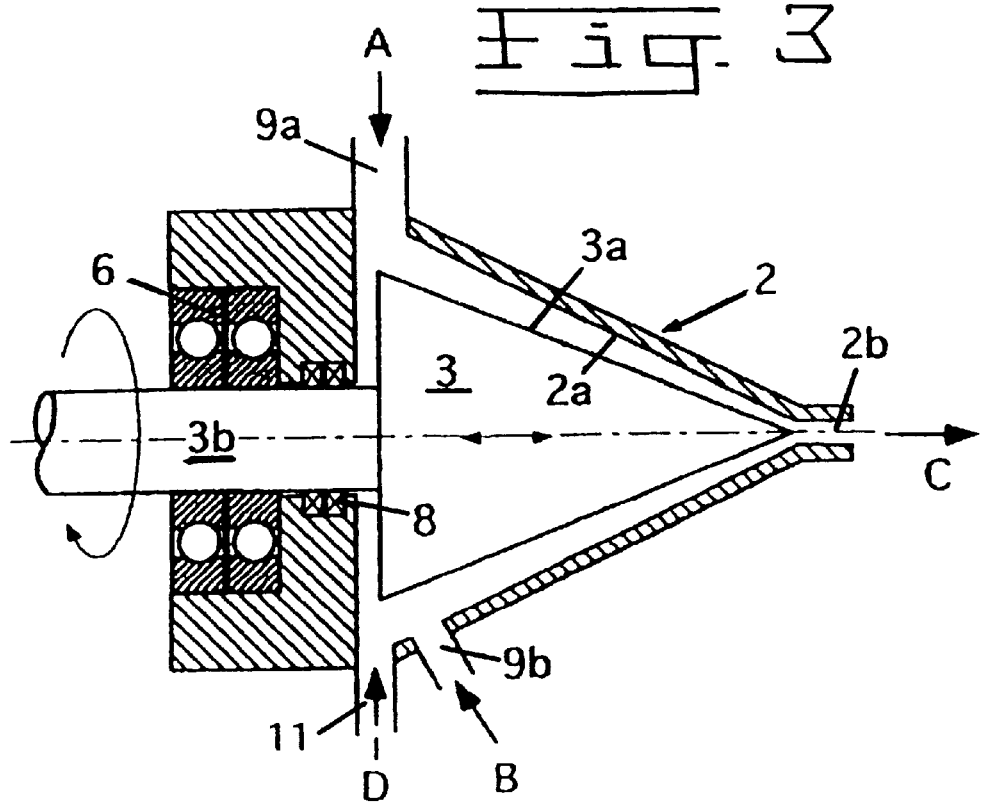

CONTINUOUS MIXER FOR LIQUIDS WITH ROTOR AND CASING GAP ADJUSTMENT

BACKGROUND OF INVENTION

This invention relates to a continuous mixer for liquids that can continuously mix a single incoming liquid or two or more incoming liquids.

The continuous mixing of one or more liquid stocks is widely practiced in the rubber molding industry and plastic molding industry. An example of this is the mixing of a base and curing agent in order to fabricate a foamed gasket.

For example, Japanese Patent Publication (Kokoku) Number Sho 53-15942 (15,942/1978), "Nozzle for mixing fluid components", teaches a nozzle for mixing a plurality of fluid components that react upon mixing with a rapid increase in viscosity or else cure upon mixing. The nozzle taught in this reference comprises a housing with a conical interior surface and a conical rotor that is rotated at its center on the axis within said housing. The surface of the rotor is provided with concavities, fins, and grooves. This nozzle can continuously mix a plural number of reactive fluid components in the absence of solvent.

The "Resin extrusion apparatus having a rotating conical element" disclosed in Japanese Patent Application Laid Open (Kokai) Number Hei 2-43008 (43,008/1990) comprises a rotating element whose exterior surface is a conical surface and whose rotational axis is the central axis thereof and a fixed element having a conical interior surface that faces the aforesaid rotating conical surface across a narrow gap. The design is such that rotation of the rotating element causes resin raw materials to be mixed in and extruded through the gap between the conical surfaces of the rotating and fixed elements.

The "Method for fabricating foam gaskets" disclosed in Japanese Patent Application Laid Open (Kokai) Number Hei 3-94876 (94,876/1991) employs a mixing chamber that is equipped internally with a surface-grooved rotating element and that has a nozzle formed at its bottom. The two liquids making up a two-part foamable plastic (the base and curing agent) are separately transported into this mixing chamber and mixed therein, and the resulting liquid mixture is discharged from the nozzle onto the sealing region of the particular substrate.

The "Apparatus for preparing silicone foam" of Japanese Patent Application Laid Open (Kokai) Number Hei 6-99509 (99,509/1994) solves a problem occurring with Japanese Patent Application Laid Open Number Hei 3-94876 in that the interior of the mixing chamber and nozzle element of the applicator must be cleaned with solvent after each application cycle. In the former a preheater is provided on the circumference of a liquid delivery hose that runs from the mixer to the discharge nozzle.

Several means have been employed or attempted in prior art apparatuses for continuously mixing liquids in order to control the temperature and pressure within the mixer during mixing into prescribed ranges or control the size of particulates within the mixed liquid. These means include:

(1) installation of a thermal medium jacket on the casing of the mixing apparatus and adjustment of the temperature and flow-rate of the thermal medium in the jacket (thermal medium control);
(2) adjustment of the rotation rate of the rotor in the mixing apparatus (rotor rotation control);
(3) pressure control through installation of a throttle on the mixed liquid outlet from the mixing apparatus (throttle control); and
(4) adjustment in the input feed amounts (input flow-rate control).

These prior art means described above suffer from various problems. Temperature control by thermal medium control (1) has a poor response. In the case of rotor rotation control (2), a change in rotor rpm ends up causing a change in the intensity of mixing imparted to the mixing inputs. In the case of throttle control (3), the installation of a throttle at the outlet increases the resident amount of the input. The drawback to input flow-rate control (4) is that variations in the material feed also affect upstream and downstream processes. Moreover, a rapid response and high accuracy are required in order to regulate the internal temperature and pressure in the mixer in particular when a rapid chemical reaction is produced upon mixing (for example, in the case of curing by reaction). However, the prior art technologies are unable to satisfy this requirement. Another drawback to the prior art technologies is that they cannot regulate the particle size within the mixed liquid when the liquid input contains particulate.

The present invention was developed in order to solve the various problems described above. Specifically, the object of the present invention is to provide a continuous mixer for liquids that can continuously mix a single or several liquid inputs and that is capable of a highly responsive and very precise control of the temperature and pressure of the mixed liquid afforded by the liquid input. Another object of the present invention is to provide a continuous mixer for liquids which can control the temperature and pressure of the mixed liquid produced from the liquid input, which does not cause variations in the intensity of mixing of the mixed liquid, which minimizes the resident amount of the inputs, and which has little effect on upstream and downstream processes. A further object of the present invention is to provide a continuous mixer for liquids that can regulate the particle size in the mixed liquid from the liquid input in combination with regulation of the temperature and pressure.

The aforesaid objects are achieved by having the rotor of a continuous mixer assume the form of a cone or truncated cone centered on the axis of rotation with the mixed liquid discharge side at its vertex; having the interior surface of the casing of the mixer assume the form of a truncated cone that matches the shape of the rotor; setting the vertical angle of the truncated cone casing equal to or not substantially different from the vertical angle of the rotor; axially displacing the rotor or casing along the rotation axis; and thereby adjusting the gap between the rotor and casing.

BRIEF DESCRIPTION OF DRAWINGS

FIG. 1 contains a cross section of the first embodiment of the continuous mixer for liquids according to the present invention.

FIG. 2 a section view taken along line 2—2 in FIG. 1.

FIG. 3 shows the second embodiment of the continuous mixer for liquids according to the present invention.

SUMMARY OF INVENTION

A continuous mixer for liquids comprises a casing having a conical interior surface, a central axis, and a discharge outlet at the apex of the cone formed by the conical interior surface, a rotor that rotates at its center on the axis of the cone and has a conical exterior surface whose vertical angle is approximately equal to the vertical angle of the conical interior surface, a pressure-transport device that has one or more feed lines which communicate with a gap between the interior surface of the casing and the exterior surface of the rotor a position removed from the discharge outlet and that delivers one or more liquid inputs under pressure through the feed lines, and a gap-adjustment device capable of altering the gap width along the axial direction. The internal pressure and temperature or the mixer can be controlled or adjusted while the rotor is rotating by changing the gap width along the axial direction.

DESCRIPTION OF INVENTION

In specific terms, the present invention provides a continuous mixer for liquids comprising a casing having a conical interior surface, a central axis, and a discharge outlet at the vertex of the conical interior surface, rotatably positioned within the casing on the central axis a rotor having a conical exterior surface with a vertical angle approximately equal to the vertical angle of the conical interior surface of the casing thereby forming a gap between the conical interior surface of the casing and the conical exterior surface of the rotor, a pressure-transport device with at least one feed line communicating with the gap at a position removed from the discharge outlet and that delivers under pressure at least one liquid, and a gap-adjustment device capable of altering width of the gap along the axial direction by movement of the rotor along the central axis relative to the conical interior surface of the casing.

In a preferred embodiment of the present invention, sensors are provided that measure the mixed liquid product for pressure, temperature, and/or particle size within the mixed liquid product in real time and the rotor/casing gap is adjusted by axially displacing the rotor so as to maintain the values measured by the sensors in prescribed ranges.

In addition, the overall shear force applied to the mixed liquid is held at a constant or prescribed value by variable adjustment of the rotor rpm in response to changes in the residence time of the mixed liquid caused by changes in the mixed liquid volume within the mixer due to changes in the rotor/casing gap.

When the temperature or pressure of the mixed liquid is to be raised, the present mixer can provide a facile, highly accurate, and very responsive control within the particular prescribed ranges through its ability to increase the temperature and pressure of the mixed liquid by axial displacement of the rotor or casing along the rotational axis so as to narrow the rotor/casing gap. Moreover, when the liquid input contains particulate and the mixer is required to control or regulation the particle size in the mixed liquid, the structure according to the present invention can provide this control or regulation of particle size in the mixed liquid again through adjustments in the rotor/casing gap.

Furthermore, the present mixer avoids the variations in the intensity of mixing of the mixed liquid that can be produced by variations in the residence time of the mixed liquid due to adjustments in the rotor/casing gap. In the mixer under consideration, the rotor rpm is matched to adjustments in the rotor/casing gap in conformity to the longer or shorter residence time by the mixed liquid within the mixer in order to control the total shear force applied to the mixed liquid to a prescribed or constant level. This controls the intensity of mixing into a prescribed range.

The present mixer can also be cleaned simply and rapidly once the mixer has been stopped. This is accomplished by establishing the smallest possible rotor/casing gap at the end of a mixing cycle, which serves to minimize the amount of mixed liquid remaining in the mixer. The mixing force can also be increased by providing elevations and depressions, e.g., dimples, on the rotor surface.

The present mixer is effective when the viscosity of the liquid input is at least 10 mPa·s and is more effective when the viscosity is at least 1,000 mPa·s. It is also effectively applied to curable liquid inputs.

Preferred embodiments of the present invention are described below with reference to the drawings. Elements in common among the drawings retain the same reference numbers throughout and will not be repetitively described.

FIG. 1 contains a cross section of a first embodiment of the present continuous mixer for liquids. The continuous mixer for liquids 1 in this drawing is provided with a casing 2, rotor 3, pressure-transport device 4, and gap-adjustment device 5.

The casing 2 has a conical interior surface 2a and a discharge outlet 2b provided at the vertex thereof. The rotor 3 is rotatably supported at its center on the axis Z of the cone by bearings 6 that support rotating axle 3b. The rotor 3 is driven by a rotating drive device 7. 8 in the figure refers to an axis seal that prevents the infiltration of the liquid inputs into the bearings 6.

The rotor 3 in this first embodiment presents a conical exterior surface 3a that has a vertical angle that is approximately equal to that of the conical interior surface 2a of the casing 2. However, as will be discussed below, the vertical angles of the conical interior surface 2a and the conical exterior surface 3a need not be identical and angles that are not substantially different may be used, for example, the difference between the angles can be less than or equal to 15°. The rotor 3 in FIG. 1 has a conical shape, but it may be a cone cut off at the top, that is, a truncated cone.

The pressure-transport device 4 comprises, for example, pressure pumps 4a and input containers 4b, and has feed lines 9a and 9b which communicate with the rotor/casing gap at positions removed from the discharge outlet 2b of the casing 2. This device functions to transport one or more inputs under pressure through the feed lines. In the example under consideration, the liquid inputs are a base A and a curing agent B.

The gap-adjustment device 5 is set up to axially displace the rotor 3 or casing 2 or both in order to alter the gap along the axial direction between the rotor 3 and casing 2. This gap-adjustment device 5 can comprise, for example, a linear-displacement cylinder and a controller.

As shown in FIG. 1, the continuous mixer for liquids 1 according to the present invention is also provided with sensors 10a, 10b, and 10c for measurement on the mixed liquid of the internal pressure P, temperature T, and/or particle size d within the mixed liquid. These sensors measure P, T, and d in real time. The values measured by the sensors 10a, 10b, and 10c are transmitted to the gap-adjustment device 5, which adjusts the rotor 3/casing 2 gap by axial displacement of the rotor 3 so as to maintain the said measurement values in prescribed ranges.

The continuous mixer of FIG. 1 is an example in which the vertical angle of the conical exterior surface 3a of rotor 3 is equal to the vertical angle of the conical interior surface 2a of the casing 2. This embodiment is also an example of the mixing of a curable liquid input having 2 parts, a base A and a curing agent B. This embodiment is additionally provided with a cleaning fluid inlet 11 in support of the post-mixing cleaning process.

FIG. 2 contains the cross section at 2—2 in FIG. 1. In FIG. 2, feed lines 9a and 9b are supply inlets (feed lines) for the base A and curing agent B, respectively. The feed inlet 9b for curing agent B is provided in the side of the casing 2 and in diametric opposition to the feed line 9a for base A. This structure prevents curing by any mixed liquid C that may flow into the axis seal 8. However, the positions of the feed lines for the base A and curing agent B and of cleaning fluid inlet 11 for cleaning fluid D are not limited to the positions shown in the figures and can be modified as desired.

Application of the embodiment depicted in FIGS. 1 and 2 may require control of the pressure P of the mixed liquid into a particular range in order to thereby regulate the extent of development of a reaction during mixing. When in such an application the pressure P of the mixed liquid has trended upward, control can be exercised by displacing the rotating axle 3b of the rotor 3 so as to widen the rotor 3/casing 2 gap. In contrast, when the pressure P of the mixed liquid has trended downward, control can be exercised by displacing the rotating axle 3b of the rotor 3 so as to narrow the rotor 3/casing 2 gap. Control can be effected by the same processes when the temperature T of the mixed liquid must be controlled into a prescribed range in order thereby to regulate the extent of reaction development.

The rotating axle 3b of the rotor 3 can be displaced so as to narrow the rotor 3/casing 2 gap when a reaction gas evolved within the mixed liquid by reaction must be stirred and dispersed within the mixed liquid or must be dispersed as bubbles with relatively smaller sizes.

With regard to cleaning that must be carried out after a mixing cycle in order to prevent the cure and deposition within the apparatus of the mixture from a curable liquid input, cleaning of the interior of the instant apparatus is highly facilitated by bringing the rotor 3/casing 2 gap to its narrowest at this time and discharging the mixture within the apparatus through liquid mixture discharge outlet 2b.

FIG. 3 contains a drawing of a second embodiment of the present continuous mixer for liquids. FIG. 3 depicts an example in which the vertical angle of the conical interior surface 2a of casing 2 is larger than the vertical angle of the conical exterior surface 3a of rotor 3. When in this embodiment mixing and discharge are to be run on a repetitive but intermittent basis, the rotor 3 can be displaced toward the mixed liquid discharge outlet 2b in order to close the discharge outlet 2b using the tip of the conical rotor 3. In this manner the rotor 3 functions like an ON/OFF valve while at the same time the zone of resident mixed liquid is minimized.

The present continuous mixer for liquids 1 is effectively applied to the mixing of materials that are liquid at the time of mixing and particularly to the mixing of curable inputs comprising a base and curing agent. In addition, it is useful for mixing liquid inputs, and particularly a base and curing agent, that have a viscosity of at least 10 mPa·s at the time of mixing. It is even more useful for viscosities of at least 1,000 mPa·s and can be used at viscosities up to 50,000 mPa·s.

With regard to the curable liquid inputs comprising a base and curing agent that are preferably used in the present invention, this designates base and curing agent liquid inputs that after mixing undergo a crosslinking reaction and thicken and finally cure when held at ambient temperature, or when heated, or when exposed to high-energy radiation such as ultraviolet radiation. A curable polymer composition is a typical example of such liquid inputs. The curable polymer composition can be a room temperature-curable polymer composition, a thermosetting polymer composition, or a polymer composition curable by high energy radiation. It can cure to give a rubber, gel, or hard resin. The base or curing agent or both may contain a particulate, for example, a filler powder or various other additives, and thus "liquid" for purposes of the present invention also encompasses pastes.

Typical examples of the curable polymer composition under consideration are curable silicone compositions, polyurethane resin compositions, epoxy resin compositions, unsaturated polyester compositions, silane-modified polyether compositions, silane-modified polyisobutylene compositions, polysulfide compositions, and so forth. Among these, curable silicone compositions are preferred.

A typical curable silicone composition is the composition comprising: a base (A) whose main components are
(a) polyorganosiloxane having at least two alkenyl groups in each molecule,
(b) reinforcing filler, and
(c) platinum catalyst and a curing agent (B) whose main components are
(d) polyorganohydrogensiloxane having at least 2 silicon-bonded hydrogen atoms in each molecule and
(b) reinforcing filler,
that cures to give a rubber, gel, or hard resin upon the mixing of these two components (A) and (B) and holding the resulting mixture at room temperature or heating the resulting mixture.

Among these curable silicone compositions, compositions in which component (a) is polydiorganosiloxane are well known as addition reaction-curing silicone rubber compositions by the individual skilled in the art. When such a curable silicone rubber composition contains an addition-reaction inhibitor, it will produce a silicone rubber molding, e.g., a silicone rubber gasket, silicone rubber rod, silicone rubber tube, etc., when heated to 50° C. or more in order to accelerate curing.

When it is desired that the curable silicone composition produce a foam by foaming while curing, a component such as, for example, polyorganosiloxane containing at least 2 silanol groups in each molecule or an organic blowing agent can be used as the foaming component in the above-described base or curing agent.

The alkenyl-functional polyorganosiloxane (a) in the base is exemplified by vinyldimethylsiloxy-endblocked polydimethylsiloxanes, vinyldimethylsiloxy-endblocked dimethylsiloxane-methylphenylsiloxane copolymers, vinyldimethylsiloxy-endblocked dimethylsiloxane-methylphenylsiloxane-vinylmethylsiloxane copolymers, and trimethylsiloxy-endblocked dimethylsiloxane-vinylmethylsiloxane copolymers. The preferred viscosity for component (a) is 100 to 100,000 mPa·s at 25° C.

The reinforcing filler (b) is a filler whose admixture increases the mechanical strength of the cured product afforded by the curable silicone composition. Examples are microparticulate silicas such as dry-process silica and wet-process silica, carbon black, and colloidal calcium carbonate.

The platinum catalyst (c) is exemplified by chloroplatinic acid, chloroplatinic acid dissolved in alcohol or ketone, chloroplatinic acid/alkenylsiloxane complexes, and complexes between chloroplatinic acid and a diketone or olefin.

The polyorganohydrogensiloxane (d) is exemplified by trimethylsiloxy-endblocked polymethylhydrogensiloxanes, trimethylsiloxy-endblocked dimethylsiloxane-methylhydrogensiloxane copolymers, and methylhydrogensiloxy-endblocked dimethylsiloxane-methylhydrogensiloxane copolymers. The preferred viscosity for component (d) is 1 to 10,000 mPa·s at 25° C.

Component (d) is preferably used in an amount that provides values from 0.5:1 to 20:1 for the molar ratio of the total silicon-bonded hydrogen atoms in component (d) to the total of all alkenyl in component (a). A good curability essentially cannot be obtained when this ratio is below 0.5:1.

In contrast, when this ratio exceeds 20:1, the cure rate becomes excessively fast and handling is strongly impaired.

Another example of a curable silicone composition is the composition comprising: a base (A') whose main components are
(e) silanol-endblocked polydiorganosiloxane,
(b) reinforcing filler, and
(c) condensation reaction-accelerating catalyst and a curing agent (B') whose main components are
(f) hydrolyzable group-functional organosilane or organosiloxane oligomer and
(b) reinforcing filler,
that cures into a rubber upon the mixing of these two components (A') and (B') and holding the resulting mixture at room temperature. This is also known as a room temperature-curable silicone rubber composition. These room temperature-curable silicone rubber compositions are well known to the individual skilled in the art.

The present invention is not limited to the embodiments described above, and various modifications are of course possible insofar as the essential features of the present invention are not overstepped.

As has been described above, the continuous mixer for liquids according to the present invention can regulate or adjust the temperature and pressure within the mixer or the particle size within the mixed liquid simply through adjustments in the rotor/casing gap as generated by axial displacement of the rotor or casing along the mixing axis of rotation. In addition, with regard to cleaning once the mixer has been stopped, the residual mixed liquid in the mixer can be minimized by a narrowing of the rotor/casing gap. Another advantage to the present mixer is that it can provide an ON/OFF valve function at the mixed liquid discharge outlet when mixing and discharge are run repetitively but intermittently.

The present continuous mixer for liquids therefore provides the following advantages: it can continuously mix a single or two or more liquid inputs; it provides a highly responsive and very accurate control of the temperature and pressure of the mixed liquid; it does not cause variations in the intensity of mixing of the mixed liquid; it minimizes the resident amount of the input; it has little effect on upstream and downstream processes; and it can control or regulate the particle size in the mixed liquid as well as the temperature and pressure.

We claim:

1. A continuous mixer for liquids comprising a casing having a conical interior surface and a discharge outlet at the vertex of the conical interior surface, a central axis, a rotor rotatably positioned within the casing on the central axis having a conical exterior surface with a vertical angle approximately equal to the vertical angle of the conical interior surface of the casing thereby forming a gap between the conical interior surface of the casing and the conical exterior surface of the rotor, a pressure-transport device with a least one feed line communicating with the gap at a position removed from the discharge outlet and that delivers under pressure at least one liquid, and a gap-adjustment device capable of altering width of the gap in the axial direction by movement of the rotor along the central axis relative to conical interior surface of the casing, and one or more sensors for measuring temperature within the casing in real time thereby providing input to the gap-adjustment device to control the gap width thereby maintaining the value for the temperature within a desired range.

2. A continuous mixer for liquids comprising a casing having a conical interior surface and a discharge outlet at the vertex of the conical interior surface, a central axis, a rotor rotatably positioned within the casing on the central axis having a conical exterior surface with a vertical angle approximately equal to the vertical angle of the conical interior surface of the casing thereby forming a gap between the conical interior surface of the casing and the conical exterior surface of the rotor, a pressure-transport device with a least one feed line communicating with the gap at a position removed from the discharge outlet and that delivers under pressure at least one liquid, and a gap-adjustment device capable of altering width of the gap in the axial direction by movement of the rotor along the central axis relative to conical interior surface of the casing, one or more sensors for measuring particle size in a mixed liquid product comprising a particulate in real time thereby providing input to the gap-adjustment device to control the gap width thereby maintaining the value for the particle size within a desired range.

* * * * *